Oct. 1, 1963 P. J. MAZZIOTTI ETAL 3,105,369
CONSTANT VELOCITY UNIVERSAL JOINT
Filed March 6, 1961

*INVENTOR.*
PHILIP J. MAZZIOTTI
EVERETT H. SHARP
BY *Walter E. Pavlick*
ATTORNEY

United States Patent Office 3,105,369
Patented Oct. 1, 1963

3,105,369
CONSTANT VELOCITY UNIVERSAL JOINT
Philip J. Mazziotti, Toledo, Ohio, and Everett H. Sharp,
Lambertville, Mich., assignors to Dana Corporation,
Toledo, Ohio, a corporation of Virginia
Filed Mar. 6, 1961, Ser. No. 93,383
12 Claims. (Cl. 64—21)

This invention relates to universal joints in general and more specifically to constant velocity universal joints of the drive ball type wherein the torque transferring members are relatively movable in an axial direction.

It is a recognized fact that cross pin type universal joints, which were originated early in the art, when operating at an angle will distort the steady uniform rotation of the driving shaft to an irregular jerky rotary motion of the driven shaft. This distortion is not due to mechanical imperfection but, as is well known, is due to the faulty mechanical principle of this type of joint.

The greater angles of operation and speeds of rotation of present day joint applications have resulted in increased demands for workable and inexpensive constant velocity joints to overcome this irregular transfer of rotation. Constant velocity universal joints in themselves are old in the art and were primarily evolved to overcome the deficiencies in the performance of the cross pin type joint. It is well known to those skilled in the art that in order to provide a transfer of rotation at a constant velocity between members disposed at an angle to one another, it is sufficient to provide an intermediate revoluble member between the driving and driven members bisecting the angle between the axes of these members. In the ball type constant velocity universal joint, the driver balls serve as the intermediate member.

One of the problems in every constant velocity joint of the ball type is maintaining the ball orbit in a single plane which bisects the angle between the axes of the adjoining members. Many prior art structures have provided various means to position the plane of the ball orbit, such as a driver ball cage combined with means to position the cage. However, these prior art devices result in an undesirable multiplicity of parts and in a high degree of friction which is undesirable in that it reduces the operating efficiency of the universal joint and shortens the useful life thereof.

The present invention is directed to the above problem in conjunction with yet another problem pertaining to joint applications. When the angle between the axes of the driving and driven members changes resulting in axial displacement or when the driving means and driven means vary in their relative axial displacement for other reasons, the coupling therebetween must provide means to accommodate this variable length. In prior art couplings this variation is usually accommodated in a slip arrangement separate from the universal joint, such as a splined stub shaft and a sleeve yoke assembly which yoke and shaft are movable relative to each other. However, this assembly by its very nature has a high degree of friction therein which resists such variation under a torque load. Another disadvantage is the plurality of parts involved, since the slip joint and universal joint are two separate structures.

More recent developments in the art have provided for accommodating the coupling's variation in length within the universal joint itself. One such embodiment is shown in a copending application Serial No. 93,734 filed March 6, 1961, wherein the outer race of a ball type constant velocity joint is made in the form of a housing and the inner race is allowed to move axially relative thereto. Drive balls are positioned between the races and in engagement therewith for transferring torque therebetween. The means for positioning the drive balls in a bisecting plane comprise separate pilot means associated with each drive ball and means to position the pilot means. Another embodiment is shown in Patent No. 2,911,805 wherein the positioning means for retaining the balls within a bisecting plane remains similar to the prior art positioning means and has retained the drive ball cage in combination with means for positioning the cage. In both the above embodiments the drive balls are disposed in a plurality of aligned axially extending grooves provided in the inner and outer races.

Both the above and other prior art structures, which accommodate axial displacement and transfer rotation at a constant velocity, require means to position the cage or pilot means which in turn position the drive balls and therefore have a multiplicity of parts, which parts increase the cost of the joint and also the frictional resistance to angular and axial displacement within the joint.

Other prior art structures, as shown in Patent No. 2,309,939 having all the grooves in each member disposed in the same direction, disclose constant velocity universal joints which will accommodate axial movement by relieving the bore in the outer race so that it does not engage the ball cage. However, the cage is still maintained in engagement with the inner ball race. This presents an undesirable condition in that while the drive balls positioned within the cage are free to move relative to the outer race during axial movement, they are held from moving relative to the inner race since the ball cage is engaged thereby. This results in a skidding or sliding type of movement between the balls and the races instead of a low friction rolling movement of the balls.

It is therefore an object of this invention to provide a constant velocity universal joint which in itself will accommodate both the relative angular and axial displacement between the driving and driven means.

A further object is to provide such a constant velocity universal joint in which this relative angular and axial displacement is accomplished with a very small amount of frictional resistance and with a balance of axial forces.

Yet another object of this invention is to provide such a universal joint with simple drive ball positioning means requiring a minimum of parts.

It is a still further object to provide such a universal joint which is simple to construct, easy to assemble, yet inexpensive and durable.

Other and further objects of this invention will become apparent from the following detailed description when taken in conjunction with the accompanying drawings in which.

Figure 1:
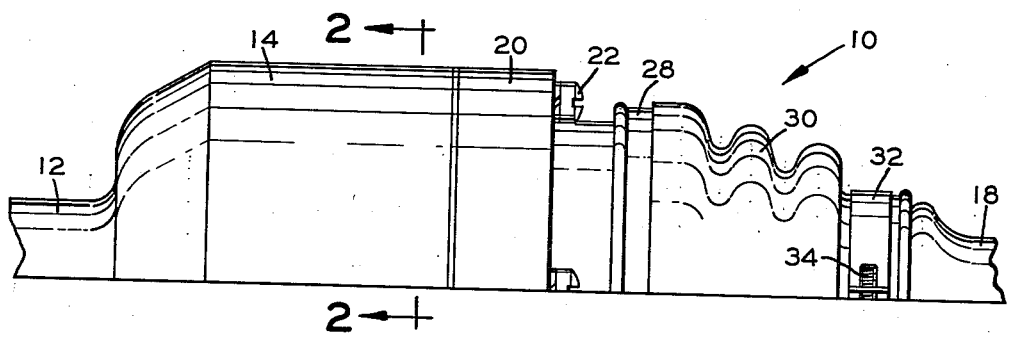
FIG. 1 is an elevational view in full of a constant velocity universal joint embodying this invention.

In one preferred embodiment of this invention, the universal joint is composed of an outer race or housing having a first and a second like plurality of helical grooves provided on the inner surface thereof. These first and second pluralities of grooves are of equal helical angle but are circumferentially inclined in opposite directions with respect to the axis of the outer race. Disposed within the central axial opening of this housing and adapted for both angular and axial movement relative thereto is an inner race. The inner race is also provided with a first and a second like plurality of helical grooves on the periphery thereof; the first plurality of grooves on the inner race being disposed in complementary relationship with and of equal helix angle to the first plurality of helical grooves in the outer race but circumferentially inclined in the opposite direction; the second plurality of grooves on the inner race being disposed in complementary relationship with and of equal helix angle to the second plurality of helical grooves in the outer race but circumferentially inclined in the opposite direction. Since the complementary grooves are of equal angle but inclined oppositely, the complementary grooves are mirror images of each other. The result is that the outer and inner races are provided with a first and a second like plurality of complementary, equally inclined, mirror image grooves in intersecting relationship, with the second plurality of grooves inclined oppositely with respect to the first plurality of grooves.

Interposed in driving relation between the inner and outer races are a plurality of driver balls, one being disposed in each pair of complementary grooves. Since the grooves are in intersecting relationship, each driver ball can only be positioned within the groove intersection. A drive ball cage is positioned between the inner and outer races and embraces all the drive balls maintaining them in a single plane. Both the inner and outer races are spaced from and do not positionably engage the drive ball cage.

As is well known in the art, when torque is transferred between races having grooves disposed in intersecting relationship, the drive balls contained therein are urged axially. In the present embodiment when torque is transferred between the inner and outer races, since each plurality of complementary grooves is circumferentially inclined opposite to the other like plurality, half of the drive balls are urged axially in one direction and the other half are urged axially in the other direction. However, the balls are restrained within a single plane by the embracing ball cage and cannot move axially relative to each other. Since there is an equal number of balls being urged axially in each direction there is a resultant balance of axial forces on the cage and races containing the balls. The result is that the inner and outer races are not urged axially by any forces created within the joint but may move axially and angularly relative to each other in response to externally applied loads while being supported by the drive balls interposed therebetween.

When the joint is operating with no, or little, angle between the inner and outer races, all the balls are positioned within their respective grooves intersection. However at higher joint angles, two of the sets of complementary grooves will become aligned and their axis will no longer intersect. Under this condition there is no groove intersection to position the drive balls contained therein; however, since all the balls are embraced by the ball cage, the balls in the aligned grooves will be held by the cage in the same single plane defined by the balls in the intersecting grooves. It is apparent that the cage means does not determine the bisecting plane, but merely positions all the drive balls within a single plane defined by the groove intersection, and since the cage is not positionably engaged by either race, as the races move relative to each other, the drive balls are free to move axially relative to both races with a quasi-rolling action instead of skidding.

Referring now to the drawings, the universal joint generally indicated at 10 comprises a first shaft portion 12 which terminates at one end in a cup-shaped outer member or race 14. The other end of the shaft 12 may be adapted as desired for attachment to a driving or driven means (not shown). The outer race 14 movably surrounds an integral and enlarged inner member or race portion 16 of a second shaft 18. The other end of shaft 18 may be adapted as desired for attachment to a driving or driven means (not shown). An annular cover member 20 is secured to the open end of the outer race 14 by means of a plurality of bolts 22 which extend through aligned holes in the cover and the outer race. The annular cover member 20 defines an enlarged central opening 24 through which the second shaft 18 movably extends.

A circumferential lip 26 is provided on the outer edge of cover 20 and cooperates with an annular band 28 to sealingly secure one end of the flexible boot 30 to the cover. The other end of boot 30 is sealingly attached to the shaft 18 by a ring 32. An adjusting screw 34 extends through ears on the ring 32 to facilitate assembly thereof onto the shaft 18. It is now apparent that the entire universal joint 10 is sealed so that lubricant cannot escape and contaminants may not enter. Since the boot 30 is flexible, the joint members are not restrained from relative movement.

Figure 3:
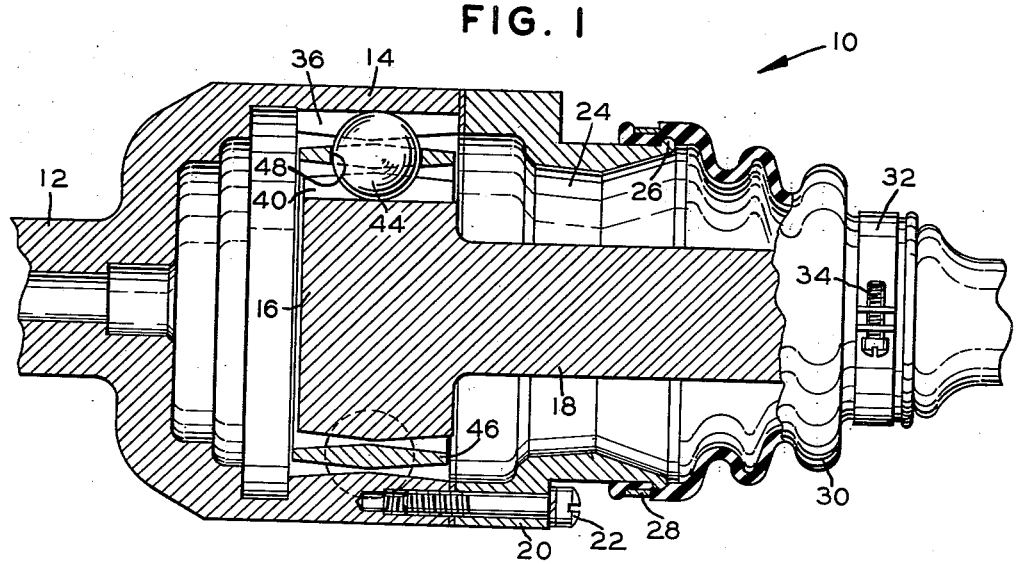
FIG. 3 is a longitudinal view, partially in section of the universal joint shown in FIG. 1 taken along the line 3—3 in FIG. 2.
Figure 2:
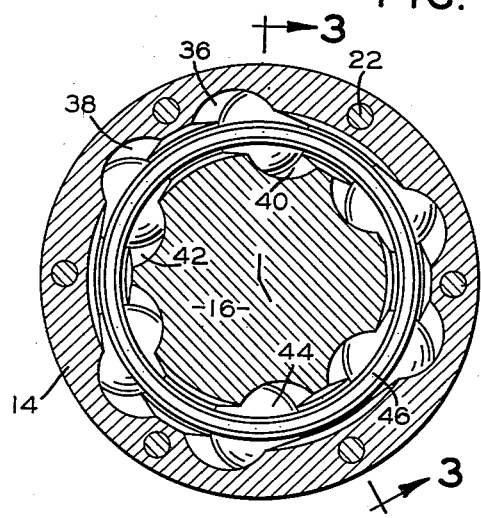
FIG. 2 is a cross sectional view of the universal joint taken along line 2—2 of FIG. 1.

As shown in FIGS. 2 and 3, the outer race 14 is provided with like pluralities of alternately arranged spaced drive ball grooves 36 and 38. The grooves 36 are of a right hand helix angle or circumferentially inclined in one direction whereas the grooves 38 are circumferentially inclined in the opposite direction or of a left hand helix angle. The grooves 36 are disposed at the same helix angle or inclination as the grooves 38.

The inner race 16 is also provided with alterately arranged like pluralities of drive ball grooves 40 and 42. The grooves 40 in the inner race 16 are positioned in complementary relationship with the grooves 36 in the outer race 14 and have the same helix angle as the grooves 36 but are disposed in the opposite direction so that the planes of the axes of the grooves 36 and 40 intersect. Similarly the grooves 42 in the inner race are positioned in cooperating relationship with and have the same helix angle as the grooves 38 in the outer race while being inclined in the opposite direction relative thereto so that the planes of the axes of the grooves 38 and 42 intersect. Thus, it is apparent that the inner and outer races 16 and 14 are provided with two like pluralities of complementary grooves 36, 40 and 38, 42 with each plurality in intersecting relationship and with the plurality of grooves 36, 40 being of the same helix angle as the plurality of grooves 38, 42 but inclined in the opposite direction.

In FIG. 3 the groove 36 in the outer race 14 and the groove 40 in the inner race 16 are shown out of their proper helical displacement and as axial grooves so that the relationship of the cooperating parts may be more clearly illustrated.

A drive ball 44 is disposed at the intersection of and in registration with each of the complementary pluralities of grooves 36, 40 and 38, 42 and is operable to transmit torque between the inner and outer races 16 and 14. An annular drive ball cage 46 is provided with a plurality of spaced, circumferentially elongated openings 48 which openings receive the drive balls 44. As is well known and understood in the art, the drive ball cage 46 along with the helical intersecting grooves 36, 40 and 38, 42 position the drive balls 44 in a single plane which always bisects the angle defined by the axes of the shafts 12 and 18 to effect the transfer of torque at a constant velocity. More particularly, the drive balls contained in the complementary drive ball grooves can only be positioned within the intersection thereof. It is apparent that as the axes of shafts 18 and 12 are displaced angularly relative to each other, the angular displacement of the groove intersection will only be one-half the total angular displacement of the axes so that the balls positioned within the groove intersections will lie in a plane which bisects the angle described by the axes of the shafts 18 and 12.

Since the points of intersection of the complementary grooves 36, 40 and 38, 42 determine the plane bisecting the angle defined by the axes of the races 16 and 14, no other means are necessary to position the bisecting plane. The cage 46 is provided to maintain all the drive balls 44 within the plane defined by the groove intersections. Since the balls 44 can only be positioned within the groove intersections it appears that the cage 46 is not necessary; this is true when the races are disposed with a little or no angle between their axes or when there is no transfer of torque taking place between the races 16 and 14. However, when the joint 10 is operating with the races disposed at large angles to each other, two pairs of the complementary grooves become aligned. The balls 44 contained within these grooves will not be positioned by these aligned grooves and therefore the cage 46 is provided to position the balls in the aligned grooves in the same plane as the balls confined in the intersection of the other grooves. Furthermore, when torque is transferred between the inner and outer races 16 and 14 the complementary grooves 36, 40 will urge the ball 44 contained therein in an axial direction opposite to the direction that the complementary grooves 38, 42 urge the balls contained therein (the races 16 and 14 under this condition could allow such movement by rotating relative to each other). However, since the balls 44 are positioned in a single plane by the ball cage 46, they cannot move axially relative to each other and remain in the bisecting plane. It should also be noted that the axial forces are circumferentially balanced so that binding of the joint does not result. More specifically in the present invention each plurality of complementary grooves 36, 40 and 38, 42 have been equally spaced and the two pluralities are alternately arranged. Although helical grooves have been shown and described, it is understood that other types will operate satisfactory, such as diagonal grooves.

As shown in both FIGS. 2 and 3, the drive ball cage 46 does not engage or contact either the outer or inner races 14 and 16. Therefore, both the cage 46 and the drive balls 44 embraced thereby are free to move relative to races 14 and 16. As races 14 and 16 move relative to each other, the drive balls 44, as is well known in the art, will move one-half the distance of the relative movement. This ball movement takes the form of a quasi-rolling motion, and not the skidding motion that would be present if the cage 46 was positionably engaged by either of the races 14 or 16 and held the balls from axial movement relative thereto.

It is readily apparent from an observation of FIGS. 2 and 3 that under static, unloaded conditions no means are provided to maintain the cage 46 suspended between the outer and inner members 14 and 16; therefore, the effect of gravity may cause the cage to move radially into engagement with one or both of the members. However, when torque is being transmitted by the joint 10, alternate balls 44 are urged in opposite axial directions by the grooves 36—40, 38—42; this opposite urging is confined by the cage 46 so that the balls remain in uniplanar relationship and the urging loads tend to centralize the cage 46 relative to the outer and inner members 14 and 16.

In addition, due to dimensional tolerances or as a result of intention, the cage 46 may lightly engage either the outer and/or inner members 14 and 16. As clearly discussed in this invention, as the outer and inner members 14 and 16 move axially relative to each other, the balls 44 positioned in the grooves therebetween must move relative to both the outer and inner members. As a result, the cage must also move relative to both of the members. Therefore, the engagement of the cage 46 with the outer or inner members 14 and 16 is not of a positioning nature, and is not necessary for the proper operation of the joint 10. The joint will operate satisfactorily with the members free from engagement with the cage or with a slight non-positioning engagement as previously mentioned.

It is now apparent from the foregoing that a constant velocity universal joint has been described that will in itself accommodate relative angular and axial displacement between a driving means and a driven means at a very low degree of friction and with a balance of axial forces therein; that has a minimum number of means to position the bisecting plane and the drive balls; that is integrally constructed, easy to assemble, and yet inexpensive and durable.

The preferred embodiment of this invention has been shown and described, but changes and modifications can be made and it is understood that this description is illustrative only and not for the purpose of rendering this invention limited to the details illustrated or described except insofar as they have been limited by the terms of the following claims.

What is claimed is:

1. A constant velocity universal joint having intermediate revoluble means which bisects the angle defined by the intersection of the axes of the drive and driven members comprising in combination, an outer member having an axial opening therein, an inner member disposed within the axial opening, torque transferring means disposed between said inner and outer members for transmitting torque therebetween, means maintaining said torque transferring means in a single torque transferring plane, and groove means in said inner and outer members positioning said torque transferring means in a plane bisecting the angle defined by the axes of the drive and driven members, said outer and inner members being both axially and angularly movable relative to each other and to said maintaining means to permit axial displacement of the drive and driven members while transferring torque at a constant velocity and said torque transferring means being operative to transfer torque regardless of the direction of revolution of the universal joint.

2. A constant velocity universal joint having intermediate revoluble means which bisects the angle defined by the intersection of the axes of the drive and driven members comprising in combination, an outer member having an axial opening therein, an inner member disposed within the axial opening, torque transferring means disposed between said inner and outer members for transmitting torque therebetween, means spaced from said members maintaining said torque transferring means in a single torque transferring plane, and groove means in said inner and outer members positioning said torque transferring means in a plane bisecting the angle defined by the axes of the drive and driven members, said groove means having axes with both transverse and axial components, said outer and inner members being both axially and angularly movable relative to each other to permit axial displacement of the drive and driven members while transferring torque at a constant velocity and said torque transferring means being operative to transfer torque regardless of the direction of rotation of the universal joint.

3. A constant velocity universal joint having intermediate revoluble means which bisects the angle defined by the intersection of the axes of the drive and driven members comprising in combination, an outer member having an axial opening therein, an inner member disposed within the axial opening, torque transferring means disposed between said inner and outer members for transmitting torque therebetween, means maintaining said torque transferring means in a single torque transferring plane, a first and a second like plurality of groove means in said outer member, each groove of said first plurality of groove means in said outer member having an axis with both axial and transverse components, each groove of said second plurality of groove means in said outer member having an axis with both axial and transverse components and inclined at the same angle as each groove of said first plurality of groove means but in the opposite direction, and a first and a second like plurality of groove means on said inner member, said first plurality of groove means on said inner member being disposed at the same angle to the axis of said inner member as said first plurality of groove means in said outer member is disposed to the axis of said outer member but in the opposite direction, said second plurality of groove means on said inner member being disposed at the same angle to the axis of said inner member as said second plurality of groove means in said outer member is disposed to the axis of said outer member but in the opposite direction, said first plurality of groove means in said outer member being arranged in complementary relationship with said first plurality of groove means in said inner member, said second plurality of groove means in said outer member being arranged in complementary relationship with said second plurality of groove means in said inner member, said pluralities of complementary groove means in said inner and outer members positioning said torque transferring means in a plane bisecting the angle defined by the axes of the drive and driven members, said outer and inner members being both axially and angularly movable relative to each other to permit axial displacement of the drive and driven members while transferring torque at a constant velocity, and said torque transferring means being operative to transmit torque regardless of the direction of rotation of the universal joint.

4. A constant velocity universal joint as defined in claim 3 wherein said pluralities of groove means comprise helical grooves.

5. A constant velocity universal joint as defined in claim 4 wherein said torque transferring means are drive balls and said means maintaining said torque transferring means in a single plane is a cage means.

6. A constant velocity universal joint for drivingly connecting drive and driven members and having intermediate revoluble means which bisects the angle defined by the intersection of the axes of the drive and driven members comprising in combination, an outer race having an axial opening therein, an inner race disposed within the axial opening, a first and a second like plurality of groove means in said outer member, each groove of said first plurality of groove means having an axis with both axial and transverse components, each groove of said second plurality of groove means having an axis with both axial and transverse components and inclined at the same angle with respect to the axis of the outer member as said first plurality of groove means but in the opposite direction, and a first and a second like plurality of groove means on said inner member, said first plurality of groove means on said inner member being disposed at the same angle to the axis of said inner member as said first plurality of groove means in said outer member is disposed to the axis of said outer member but in the opposite direction, said second plurality of groove means on said inner member being disposed at the same angle to the axis of said inner member as said second plurality of groove means in said outer member is disposed to the axis of said outer member but in the opposite direction, said first plurality of groove means in said outer member being arranged in complementary relationship with said first plurality of groove means in said inner member, said second plurality of groove means in said outer member arranged in complementary relationship with said second plurality of groove means in said inner member, torque transferring means received in each of said plurality of complementary groove means, said pluralities of groove means in said inner and outer members positioning said torque transferring means in a plane bisecting the angle defined by the axes of the drive and driven members, and means maintaining said torque transferring means in a single torque transferring plane, said outer and inner members being both axially and angularly movable relative to each other to permit axial displacement of the drive and driven members while transferring torque at a constant velocity, and said torque transferring means being operative to transfer torque regardless of the direction of rotation of the universal joint.

7. A constant velocity universal joint for drivingly connecting drive and driven members and having intermediate revoluble means which bisects the angle defined by the intersection of the axes of the drive and driven members comprising in combination, an outer race having an axial opening therein, an inner race disposed within the axial opening, a first and a second like plurality of groove means in said outer race, each groove of said first plurality of groove means having an axis with both axial and transverse components, each groove of said second plurality of groove means having an axis with both axial and transverse components and being inclined at the same angle with respect to the axis of said outer race as said first plurality of groove means but in the opposite direction, a first and a second like plurality of groove means on said inner race, said first plurality of groove means on said inner race being disposed at the same angle to the axis of said inner race as said first plurality of groove means in said outer race is disposed to the axis of said outer race but in the opposite direction, said second plurality of groove means on said inner race being disposed at the same angle to the axis of said inner race as said second plurality of groove means in said outer race is disposed to the axis of said outer race but in the opposite direction, said first plurality of groove means in said outer race being arranged in complementary relationship with said first plurality of groove means in said inner race, said second plurality of groove means in said outer race arranged in complementary relationship with said second plurality of groove means in said inner race, a drive ball received by each of said pluralities of complementary groove means, said pluralities of groove means in said inner and outer race positioning said drive balls in a plane bisecting the angle defined by the axes of the drive and driven members, and cage means spaced from said inner and outer races maintaining said drive balls in a single plane in a constant driving relationship with said groove means, said outer and inner races being both axially and angularly movable relative to each other to permit axial displacement of the drive and driven members while transferring torque at a constant velocity.

8. A constant velocity universal joint as defined in claim 7 wherein said pluralities of groove means comprise helical grooves.

9. A constant velocity universal joint having intermediate revoluble means which bisects the angle defined by the intersection of the axes of the drive and driven means coupled thereby comprising in combination, a first member, a second member operably associated with said first member and spaced therefrom, torque transferring means disposed between said first and second members for transmitting torque therebetween, means maintaining said torque transferring means in a single torque transferring plane whereby said torque transferring means are constantly operative to transmit torque and groove means in said first and second members receiving and positioning said torque transferring means in a plane bisecting the angle defined by the axes of the drive and driven members, said first and second members being both axially and angularly movable relative to each other and to said maintaining means to permit axial and angular displacement of the drive and driven members while transferring torque at a constant velocity.

10. A constant velocity universal joint having intermediate revoluble means which bisects the angle defined by the intersection of the axes of the drive and driven means coupled thereby comprising in combination, a first member, a second member operatively associated with said first member, torque transferring means disposed between said first and second members for transmitting torque therebetween, means maintaining said torque transferring means in a single torque transferring plane, a first and a second like plurality of groove means in said first member with each of said first plurality of groove means having an axis with both axial and transverse components and each of said second plurality of groove means having an axis with both axial and transverse components and inclined at the same angle as each groove of said first plurality of groove means but in the opposite direction, and a first and a second like plurality of groove means on said second member, said second plurality of groove means on said second member being disposed at the same angle to the axis of said second member as said first plurality of groove means on said first member is disposed to the axis of said first member but in the opposite direction, said second plurality of groove means on said second member being disposed at the same angle to the axis of said second member as said second plurality of groove means in said first member is disposed to the axis of said outer member but in the opposite direction, said first plurality of groove means in said first member being arranged in complementary relationship with said first plurality of groove means in said second member, said second plurality of groove means in said first member being arranged in complementary relationship with said second plurality of groove means in said second member, said pluralities of complementary groove means in said first and second members positioning said torque transferring means in a plane bisecting the angle defined by the axes of the drive and driven members, said first and second members being both axially and angularly movable relative to each other to permit axial displacement of the drive and driven means while transferring torque at a constant velocity, and said torque transferring means being operative to transfer torque regardless of the direction of rotation of the universal joint.

11. A constant velocity universal joint having intermediate revoluble means which bisects the angle defined by the intersection of the axes of a drive and driven means coupled thereby comprising in combination, an outer member having an axial opening therein, an inner member disposed within said axial opening, torque transferring means disposed between said inner and outer members for transmitting torque therebetween, means maintaining said torque transferring means in a single movable plane and in a constant torque transmitting relationship with said members, a plurality of groove means in said outer member each having a component of its axis displaced from an axially straight direction with respect to said outer member, a plurality of groove means in said inner member each being in complementary relationship with one of said groove means in said outer member and being a mirror image thereof, said groove means in said inner and outer members receiving said torque transferring means and positioning them in a plane bisecting the angle defined by the axes of the drive and driven members, said outer and inner members being both axially and angularly movable relative to each other and to said maintaining means to permit axial and angular displacement of the drive and driven means while transferring torque at a constant velocity.

12. A constant velocity universal joint having intermediate revolvable means which bisects the angle defined by the intersection of the axes of the drive and driven means coupled thereby comprising in combination, an outer member having an axis and an axially extending opening therein, an inner member having an axis and being disposed within said axially extending opening, torque transferring means disposed between said inner and outer members for transmitting torque therebetween, means maintaining said torque transferring means in a single movable plane and in a constant torque transmitting relationship with said members, a plurality of grooves in said outer member each having its axis displaced from a parallel relationship with respect to the axis of said outer member, a plurality of grooves in said inner member each having its axis displaced from a parallel relationship with respect to the axis of said inner member and each being in a complementary mirror image relationship with one of said grooves in said outer member, said grooves in said inner and outer members receiving said torque transferring means and positioning them in a plane bisecting the angle defined by the intersection of the axes of the drive and driven members, said outer and inner members being both axially and angularly movable relative to each other and to said maintaining means to permit axial and angular displacement of the drive and driven means while transferring torque at a constant velocity.

References Cited in the file of this patent

UNITED STATES PATENTS

| | | |
|---|---|---|
| 2,309,939 | Dodge | Feb. 2, 1943 |
| 2,352,776 | Dodge | July 4, 1944 |
| 2,911,805 | Wildhaber | Nov. 10, 1959 |
| 2,983,118 | Wicoff | May 9, 1961 |
| 3,002,364 | Bellomo | Oct. 3, 1961 |

FOREIGN PATENTS

| | | |
|---|---|---|
| 377,761 | Great Britain | Aug. 4, 1932 |